United States Patent
Gambino

(10) Patent No.: US 7,073,181 B2
(45) Date of Patent: Jul. 4, 2006

(54) SYSTEM AND METHOD FOR SHARING SECURE SOCKETS LAYER SESSIONS ACROSS MULTIPLE PROCESSES

(75) Inventor: Mark R. Gambino, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 10/010,992

(22) Filed: Nov. 13, 2001

(65) Prior Publication Data

US 2003/0091023 A1 May 15, 2003

(51) Int. Cl.
*G06F 9/46* (2006.01)

(52) U.S. Cl. ...................................................... 719/328
(58) Field of Classification Search ................. 719/310, 719/328
See application file for complete search history.

(56) References Cited

U.S. PATENT DOCUMENTS

| | | | |
|---|---|---|---|
| 4,912,628 A | 3/1990 | Briggs | |
| 5,537,417 A | 7/1996 | Sharma et al. | |
| 5,539,885 A | 7/1996 | Ono et al. | |
| 5,619,650 A | 4/1997 | Bach et al. | |
| 5,657,390 A * | 8/1997 | Elgamal et al. | 713/151 |
| 5,796,954 A | 8/1998 | Hanif et al. | |
| 5,802,306 A | 9/1998 | Hunt | |
| 5,848,161 A | 12/1998 | Luneau et al. | |
| 5,907,621 A | 5/1999 | Bachman et al. | |
| 6,052,785 A | 4/2000 | Lin et al. | |
| 6,094,485 A | 7/2000 | Weinstein et al. | |
| 6,105,131 A | 8/2000 | Carroll | |
| 6,128,640 A | 10/2000 | Kleinman | |
| 6,151,610 A | 11/2000 | Senn et al. | |
| 6,157,940 A | 12/2000 | Marullo et al. | |
| 6,178,438 B1 | 1/2001 | Tschirhart et al. | |
| 6,192,389 B1 | 2/2001 | Ault et al. | |
| 6,201,962 B1 | 3/2001 | Sturniolo et al. | |
| 6,202,159 B1 | 3/2001 | Ghafir et al. | |
| 6,772,333 B1 * | 8/2004 | Brendel | 713/153 |

OTHER PUBLICATIONS

ST, Stunel, May 20, 1998.*

* cited by examiner

*Primary Examiner*—Meng-Al T. An
*Assistant Examiner*—LeChi Truong
(74) *Attorney, Agent, or Firm*—Eugene I. Shkurko; Cantor Colburn LLP

(57) ABSTRACT

The invention is a system and method for sharing secure sockets layer (SSL) sessions across multiple processes, comprising: at least one SSL wrapper receiving a request for a shared SSL session from an application program; an SSL daemon process receiving at least one request for a shared SSL session from an SSL wrapper; the SSL daemon calling at least one SSL session; the SSL daemon receiving at least one return code from at least one called SSL session; at least one SSL wrapper receiving at least one return code from the SSL daemon; and at least one SSL wrapper passing a return code to the return code's requesting application.

13 Claims, 4 Drawing Sheets

SYSTEM AND METHOD FOR SHARING SECURE SOCKETS LAYER SESSIONS ACROSS MULTIPLE PROCESSES

FIELD OF THE INVENTION

This invention relates to secure data communications and more specifically the sharing of secure communications sessions across multiple processes.

BACKGROUND OF THE INVENTION

A computer program being executed on a computer is known as a computer process and may simply be referred to as a process. Processes require mechanisms for exchanging data among them. These mechanisms are known as inter process communications mechanisms (IPCs). One category of IPC, known as sockets, was initially developed in the early 1980s at the university of California at Berkeley for use with computer systems utilizing the UNIX computer operating system. Sockets technology has since been adopted by many computer software and operating system developers including IBM. Exponential increases in the use of computer networks and the expansion of public networks such as the Internet have resulted in a need for secure data communications. In response, Netscape Communications developed a secure IPC mechanism known as Secure Sockets Layer (SSL) (see U.S. Pat. No. 5,657,390). SSL is responsible for authenticating computer systems involved in the exchange of information and for encrypting and decrypting the data they exchange. SSL has been revised on at least two occasions and a derivative implementation, known as Transport Layer Security version 1 ("TLS"), is defined in Internet Engineering Task Force ("IETF") Request for Comments ("RFC") 2246.

SSL operates as an intermediary between an application process, such as a web browser, and a TCP/IP stack. TCP/IP is a combination of communications protocols used to route data over a data network and ensure its delivery. When a computer is enabled to transport data using TCP/IP the computer is referred to as having a TCP/IP stack. SSL sessions and SSL enabled processes exchange messages using a predetermined message format known as SSL Application Programming Interface ("API"). The messages exchanged are referred to as API calls. Where several instances of SSL are simultaneously executed on a computer, each instance of SSL is referred to as an SSL session.

Because an SSL session is generally tied to the application process that requested its services and terminating an application process terminates the corresponding SSL session, individual processes requiring SSL services must initiate separate SSL sessions. Current SSL implementations generally require that an application process remain un-terminated until its SSL session has completed communications. As a consequence, available computer resources must be sufficient to maintain all unterminated processes regardless of whether or not those processes are involved in active communications. Computer resources include processor time, volatile and non-volatile memory, and data throughput bandwidth. As the number of requesting processes and SSL sessions grow, the depletion of available computer resources creates the danger of computer system failure. These circumstances are often encountered in high-volume distributed computing environments including those with high numbers of concurrent transactions such as credit card transaction authorization systems. The possibility of computer system failure is heightened further where individual applications utilize multiple requesting processes or where computer systems execute multiple applications concurrently.

While such concerns may be combated by strategies such as increasing overall data throughput at the TCP/IP transport level, the present invention provides a solution that allows for SSL session sharing and makes more efficient use of existing computer resources.

SUMMARY OF THE INVENTION

The invention is a system and method for sharing secure sockets layer (SSL) sessions across multiple processes, comprising: at least one SSL wrapper receiving a request for a shared SSL session from an application program; an SSL daemon process receiving at least one request for a shared SSL session from an SSL wrapper; the SSL daemon calling at least one SSL session; the SSL daemon receiving at least one return code from at least one called SSL session; at least one SSL wrapper receiving at least one return code from the SSL daemon; and at least one SSL wrapper passing a return code to the return code's requesting application program.

The above-described and other features and advantages of the present invention will be appreciated and understood by those skilled in the art from the following detailed description, drawings, and appended claims.

DETAILED EMBODIMENT OF THE INVENTION

Although this exemplary detailed embodiment suggests the utilization of SSL sessions for secured communications, it is understood by one of ordinary skill in the art that any known alternative secured communications mechanism may be used. Alternative secured communications mechanisms include existing, future, and derivative implementations of SSL such as TLS. Similarly, although this exemplary detailed embodiment of the invention suggests the utilization of TCP/IP for transporting data across a data network, it is understood by one of ordinary skill in the art that any alternative transport protocols known in the art may be used. Alternative protocols may also include existing, future, and derivative implementations of TCP/IP.

One aspect of the current invention is to enable SSL sessions to be shared by multiple processes on computer systems which do not otherwise support SSL session sharing and on computer systems lacking operating system or kernel-based SSL session sharing. Another aspect of the invention is to provide a system and method for sharing SSL sessions that requires no inter process communications (IPC) except communications using the SSL application programming interface (API), thereby eliminating the need for applications to be reprogrammed to function with additional IPCs. Yet another aspect of the invention is to provide a system and method for sharing SSL sessions across multiple processes which enables a shared SSL session to remain active and available for use after the application process which initially requested the shared SSL session has been terminated.

Figure 2:
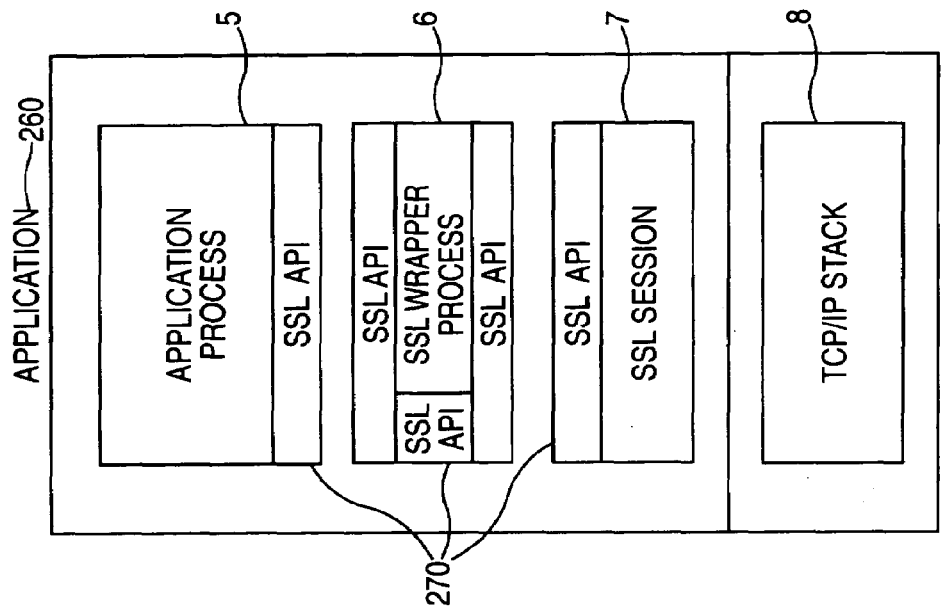
FIG. 2 shows an application enabled for using shared SSL sessions.
Figure 1:
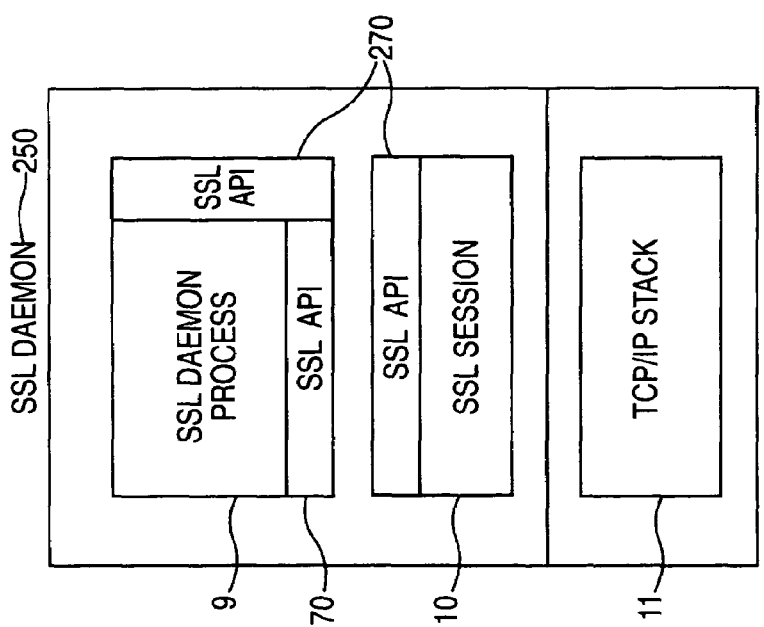
FIG. 1 shows an SSL daemon which is responsible for managing shared SSL sessions.

FIGS. 1 and 2 provide an overview of the elements that comprise an exemplary embodiment of the present invention. FIG. 1 depicts an SSL daemon, which manages shared SSL sessions, receives requests far shared sessions, and acts as a shared session's link to applications (described below). The SSL daemon 250 is comprised of an SSL daemon process 9 ("daemon process"), a shared session 10, ("shared session") and a TCP/IP stack 11. The daemon process 9 includes program code for managing shared sessions 10 and may encompass queue management techniques such as "first task in the queue–first task out of the queue" ("FIFO") and highest-priority-first as well as any other software management techniques known to one of ordinary skill in the art. The daemon process 9 also includes program code for communicating with SSL wrapper processes (described below) and shared sessions 10 using SSL application programming interface ("API") 270 calls.

If an alternative secure communications mechanism other than SSL is used then the alternative secure communications daemon would communicate with alternative secure communications wrappers and alternative secure communications sessions using the alternative secure communications mechanism's application programming interface (API).

A daemon process 9 may own or manage multiple shared sessions 10, the number of which is limited by available system memory. Furthermore, the maximum number of simultaneous API calls allotted to a given daemon process is limited by the maximum allowable number of simultaneous threads per process as determined by the host computer system. Where the desired number of concurrently executing API calls exceeds this limit, additional bandwidth may be achieved by incrementing the host computer system's maximum allowable thread setting and/or by executing multiple daemon processes.

FIG. 2 depicts the elements that comprise an application 260 enabled for SSL secured communications and enhanced by the present invention. Application 260 comprises at least one application process 5, at least ne SSL wrapper process ("wrapper") 6, at least one SSL session 7 ("unshared session"), and a TCP/IP stack 8. Where an application process 5 requests an unshared session, the application process 5 utilizes the unshared session 7 and the TCP/IP stack 8 that are tied to the application process 5. Where an application process 5 requests a shared session the application process 5 utilizes the shared session and TCP/IP stack that are tied to the daemon process (described in FIG. 1).

The wrapper process 6 includes program code for receiving requests for SSL sessions, for determining whether the request is for a shared SSL session or an unshared SSL session, for passing requests for unshared SSL sessions to the unshared SSL session 7 tied to the application process 5, and for passing requests for shared SSL sessions to a daemon process. The wrapper process 6 also includes program code for communicating with application process 5, daemon processes, and unshared sessions 7 via SSL API 270 calls.

In order for an application process 5 to indicate the type of SSL session desired, the application process 5 must include with the request an input parameter indicating the desired SSL session type. The request may also include additional input parameters, such as the data that the application process 5 is requesting to be sent over a data network via an SSL session.

Figure 3:
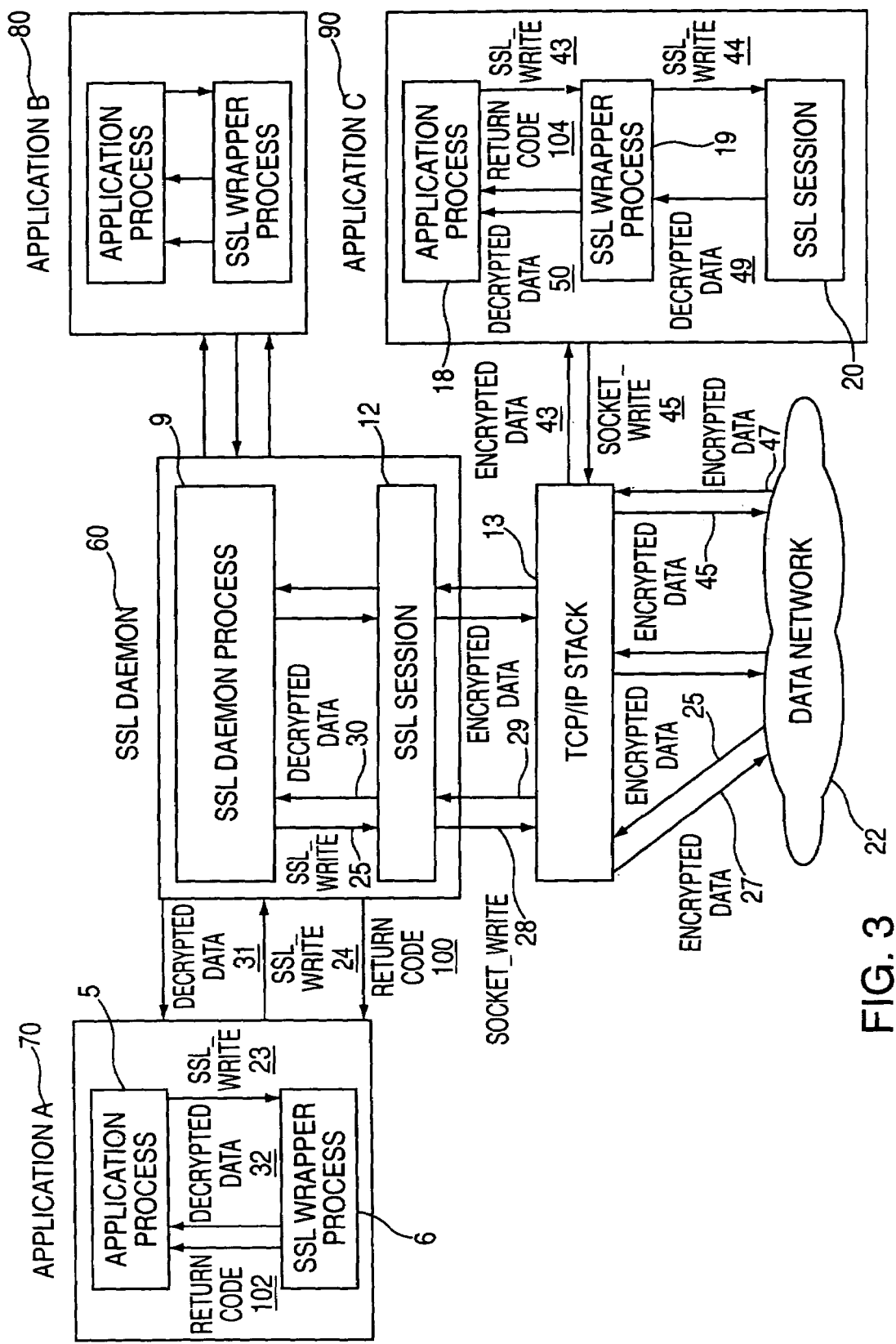
FIG. 3 shows the flow of data where an SSL daemon manages shared SSL sessions.

FIG. 3 shows an SSL daemon 60 and wrappers processes 6, 19 functioning together to satisfy requests for both shared and unshared sessions from two separate application processes 70, 90. Application A 70 is requesting the use of a shared session. A wrapper process 6 receives a request for the use of a shared session from an application process 5 in the form of an SSL_write API call 23. The SSL wrapper process 6 interprets an input parameter passed with the SSL_write API call 23 to determine whether the request is for a shared or unshared session.

When the input parameter indicates a shared session is requested, the wrapper process 6 passes the SSL_write API call 24 and any accompanying input parameters to a daemon process 9. If a shared session already exists the daemon process 9 passes the SSL_write API call 25 and accompanying input parameters to an existing shared session 12. The shared session 12 processes the SSL_write API call, and encrypts the accompanying data. The shared session reformats the SSL_write API call into a socket API call understandable by the TCP/IP stack 13 and passes a reformatted socket write API call 26 and the encrypted data to the TCP/IP stack 13. The TCP/IP stack 13 may be tied to the daemon or kernal-based, as is determined by the host computer system. The TCP/IP stack 13 packages the encrypted data according to the TCP/IP protocol and sends the encrypted data 27 over the data network 22.

The TCP/IP stack passes a first return code 98 to the shared session 12. The shared session generates a second return code 99 and passes the second return code 99 to the daemon process 9. The daemon process 9 passes the second return code 100 to the wrapper process 6. The wrapper process 6 passes the second return code 102 to the application process 5.

The application process 5 passes an SSL_read API call 123 to the wrapper process 6. The purpose of the SSL_read API call is to direct the SSL session and TCP/IP stack to await incoming data. The wrapper process 6 passes the SSL_read API call 124 to the SSL daemon process 9. The daemon process 9 passes the SSL_read API call 125 to the SSL session 12. The shared session 12 reformats the SSL_read API call into a socket read API call understandable by the TCP/IP stack 13 and passes the reformatted socket read API call 126 to the TCP/IP stack 13. If incoming data is received by the TCP/IP stack before the TCP/IP stack receives the socket read APT call, the incoming data is held by the TCP/IP stack until the TCP/IP stack receives the socket read API call.

When packaged encrypted data 28 is received by the TCP/IP stack 13 from the data network 22, the TCP/IP stack 13 unpacks the encrypted data and the encrypted data 29 is retrieved by the shared session 12. The shared session 12 decrypts the data and the decrypted data 30 is retrieved by the daemon process 9. The decrypted data 31 is retrieved from the daemon process 9 by the wrapper process 6. The application process 5 retrieves the decrypted data 32 from the wrapper process 6. The procedure is repeated for additional application processes as is visually depicted in FIG. 3.

FIG. 3 also shows application process C 90 requesting and utilizing an unshared session. The wrapper process 19 receives a request 43 for an unshared session from the application process 18 in the form of an SSL_write API call 43. The wrapper process 19 interprets an input parameter passed with the $SSL_{13}$ write API call to determine whether the request is for a shared or unshared session.

When the input parameter indicates an unshared session is requested, the wrapper process 19 passes the SSL_write API call 44 and any accompanying input parameters to the unshared session 20. The unshared session 20 processes the SSL_write API call and encrypts any accompanying data. The unshared session 20 reformats the SSL API call into a socket API call understandable by the TCP/IP stack 13 and passes the reformatted socket write API call 45 and the encrypted data to the TCP/IP stack 13. The TCP/IP stack 13 may be tied to the daemon or kernal-based as is determined by the host computer system. The TCP/IP stack 13 packages the encrypted data according to the TCP/IP protocol and sends the encrypted data 46 over the data network 22.

The TCP/IP stack passes a first return code 103 to the unshared session 20. The shared session generates a second return code 104 and passes the second return code 104 to the wrapper process 19. The wrapper process 19 passes the second return code 105 to the application process 18.

The application process 18 passes an SSL_read API call 143 to the wrapper process 19. The wrapper process 19 passes the SSL$_{13}$ read API call 144 to the SSL session 20. The unshared session 20 reformats the SSL_read API call into a socket read API call understandable by the TCP/IP stack 13 and passes the reformatted socket read API call 145 to the TCP/IP stack 13. If incoming data is received by the TCP/IP stack before the TCP/IP stack receives the socket read API call, the incoming data is held by the TCP/IP stack until the TCP/IP stack receives the socket read API call.

When packaged encrypted data 47 is received by the TCP/IP stack 13 from the data network 22, the TCP/IP stack 13 unpacks the encrypted data and the encrypted data 48 is retrieved by the unshared session 20. The unshared session 20 decrypts the data and the decrypted data 49 is retrieved by the wrapper process 19. The application process 18 retrieves the decrypted data 50 from the wrapper process 19.

Figure 4A:
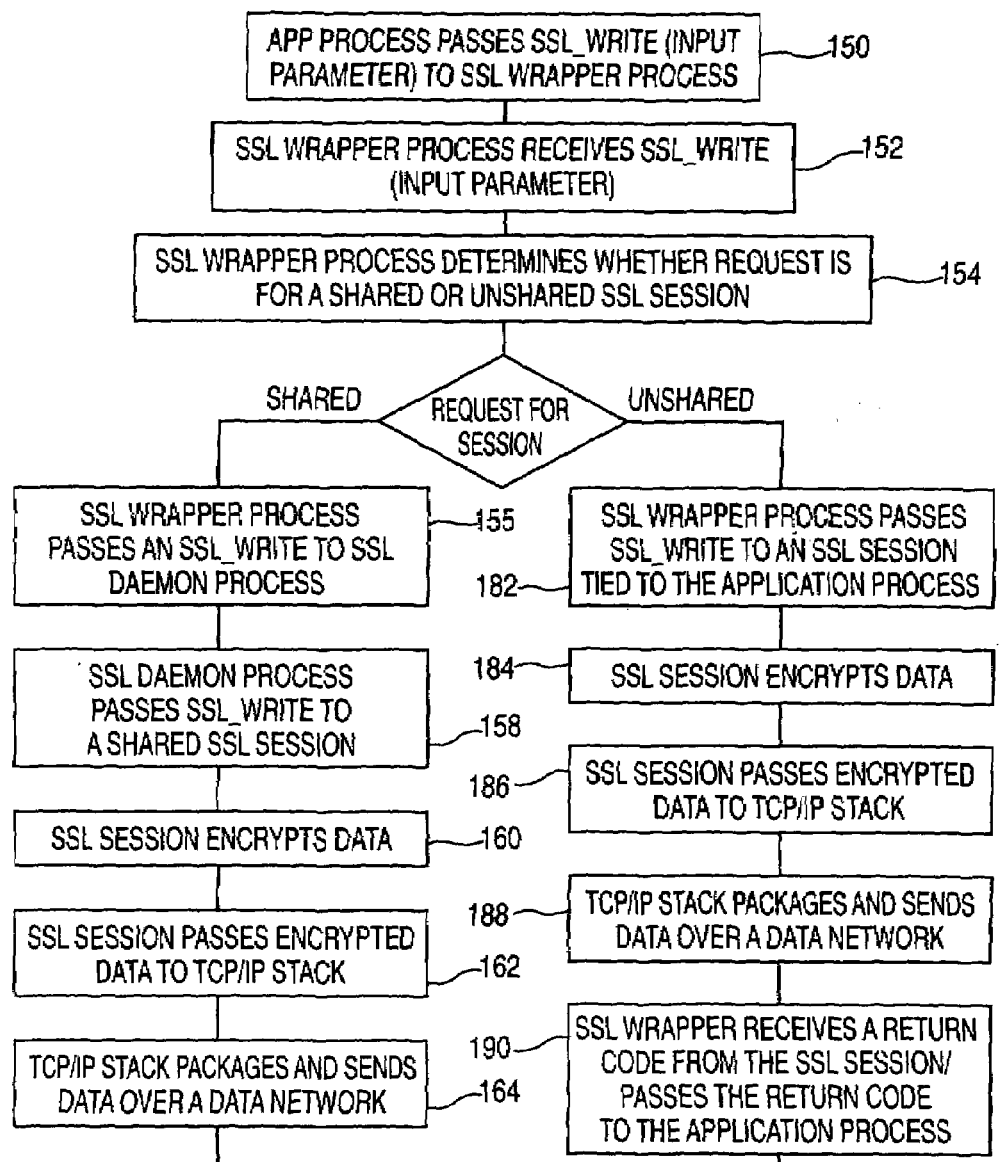
FIGS. 4a and 4b are a flow chart describing the steps for an SSL daemon to manage shared SSL sessions.
Figure 4:
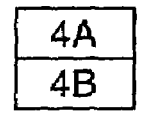
Figure 4B:
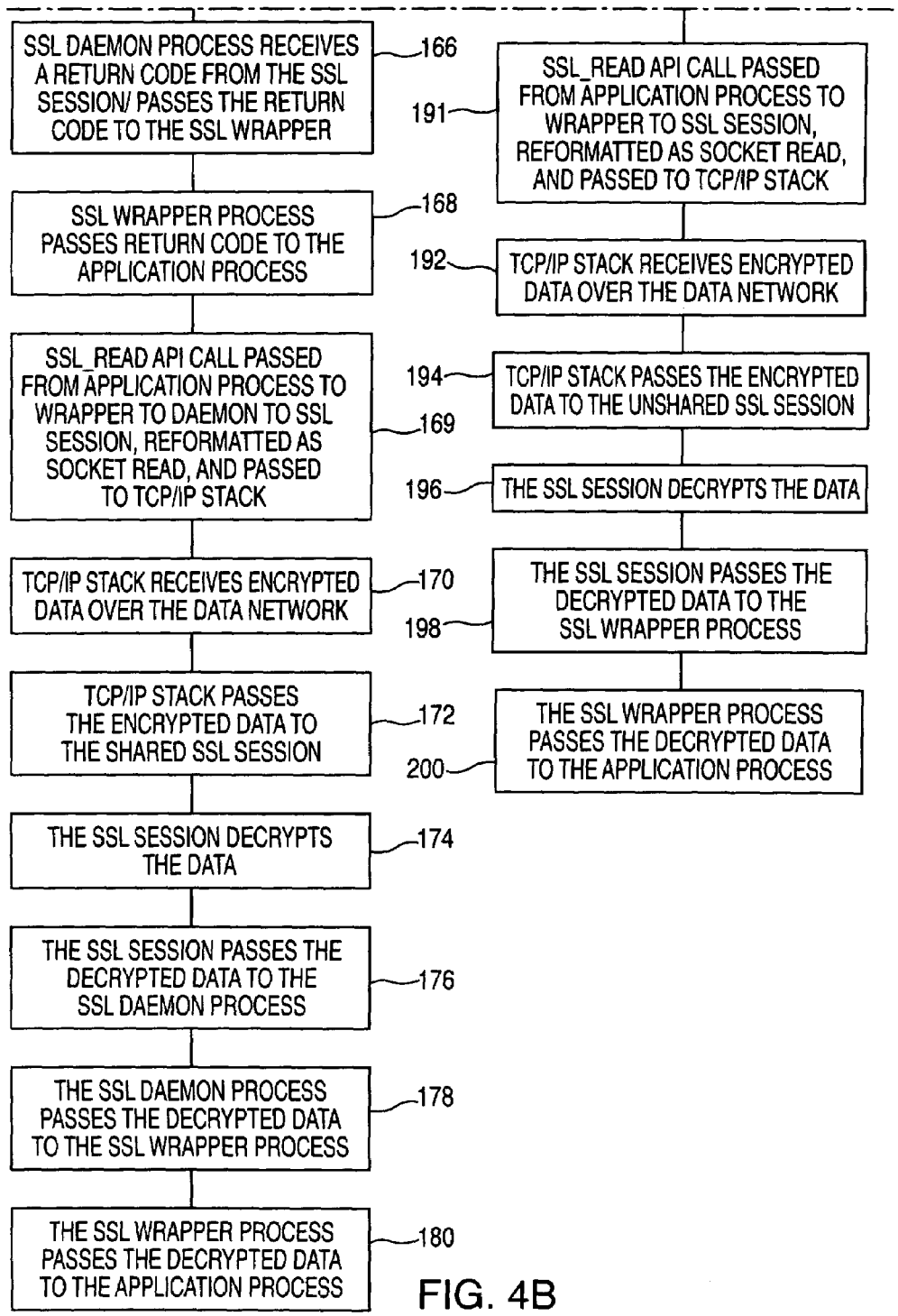

FIGS. 4a and 4b comprise a flow chart showing steps for sharing an SSL session. In FIG. 4a, an application process passes an SSL_write API call to an SSL wrapper process 150. The SSL wrapper process receives the SSL_write API call and any accompanying input parameters 152 and uses the input parameter to determine whether the application process is requesting a shared or unshared SSL session 154.

If an application process has requested a shared SSL session, the SSL wrapper process passes the SSL_write API call to an SSL daemon process 156. The SSL daemon process passes the SSL_write API call to a shared SSL session 158. The shared SSL session encrypts the data 160 and passes the encrypted data to a TCP/IP stack 162. The TCP/IP stack packages and sends the encrypted data over a data network 164. As shown in FIG. 4b, the SSL session generates a return code and passes the return code to the SSL daemon process which in turn passes a second return code to the SSL wrapper process 166. The SSL wrapper process passes a second return code to the application process 168.

The application process passes an SSL_read API call to the wrapper, the wrapper passes the SSL_read API call to the daemon process, the daemon process passes the SSL_read API call to the shared SSL session, the shared SSL session reformats the SSL_read API call into a socket read API call and passes the socket read API call to the TCP/IP stack 169.

Upon receipt of encrypted data over the data network 170, the TCP/IP stack passes the encrypted data to the shared SSL session 172. The SSL session decrypts the data 174 and passes the decrypted data to the SSL daemon process. 176. The SSL daemon process passes the decrypted data to the SSL wrapper process 178 which in turn passes the decrypted data to the application process.

Returning to FIG. 4a: If an SSL wrapper process receives a request for a separate unshared SSL session, the wrapper process passes the SSL_write API call and any accompanying data/input parameters to an SSL session tied to the application process 182. The SSL session encrypts the data 184 and passes the encrypted data to the TCP/IP stack 186. The TCP/IP stack packages and sends the encrypted data over a data network 188. The SSL wrapper receives a return code from the SSL session and passes the return code to the application process 190.

In FIG. 4b, the application process passes an SSL_read APT call to the wrapper, the wrapper passes the SSL_read API call to the unshared SSL session, the unshared SSL session reformats the SSL_read API call into a socket read API call and passes the socket read API call to the TCP/IP stack 191.

Upon receipt of encrypted data over the data network 192, the TCP/IP stack passes the encrypted data to the unshared SSL session 194. The unshared SSL session decrypts the encrypted data 196 and passes the decrypted data to the SSL wrapper process 198. The SSL wrapper process passes the decrypted data to the application process 200.

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A computer system for sharing secure sockets layer (SSL) sessions across multiple processes comprising:
  an application process;
  an SSL daemon process;
  an SSL wrapper process; and
  a plurality of SSL application programming interface (API) calls for communication between the application process and SSL wrapper process, for communication between the SSL wrapper process and the SSL daemon process, and for communication between the SSL daemon process and at least one SSL session;

wherein the SSL wrapper process receives requests for SSL sessions from an application program, determines a request is for a shared SSL session, passes the requests for the shared SSL session to the SSL daemon process, receives a return code from the SSL daemon process, and passes the return code to the application program, wherein the SSL wrapper process communication with the application process using SSL application programming interface (API) calls, the SSL wrapper process communication with the SSL daemon process using SSL application programming interface (API) calls, and the SSL daemon process communicates with SSL sessions using SSL application programming interface (API) calls.

2. The system of claim 1 wherein the requests received by the SSL wrapper process include a first input parameter, the first input parameter indicating whether or not a shared SSL session is requested.

3. The system of claim 1 wherein the SSL wrapper process receives a second input parameter and passes the second input parameter to the SSL daemon process, the second input parameter comprising the data the application process requests secured by an SSL session.

4. The system of claim 3 wherein the SSL daemon process receives a second input parameter from the application process and pauses the second input parameter to the SSL session.

5. The system of claim 1 wherein the SSL daemon process receives a request for a shared SSL session from the SSL wrapper process, passes requests for a shared SSL session to a shared SSL session, receives a return code from the SSL session, and passes the return code to the SSL wrapper process.

6. A computer implemented method for sharing secure sockets layer (SSL) sessions across multiple processes, comprising:
  receiving, by at least one SSL wrapper process, a request for a shared SSL session from an application process;
  receiving, by an SSL daemon process, at least one request for a shared SSL session from the SSL wrapper process;
  calling, by the SSL daemon process, at least one SSL session;
  receiving, by the SSL daemon process, at least one return code from at least one called SSL session;
  receiving, by at least one SSL wrapper process, at least one return code from the SSL daemon process; and
  passing by, at least one SSL wrapper process, a return code to the application process;
  wherein the SSL wrapper process communicates with the application process using SSL application programming interface (API) calls, the SSL wrapper process communicates with the SSL daemon process using SSL application programming interface (API) calls, and the SSL daemon process communicates with SSL sessions using SSL application programming interface (API) calls.

7. The method in claim 6 wherein a request for an SSL session includes a first input parameter, the first input parameter indicating whether or not a shared SSL session is requested.

8. An article of manufacture comprising:
  a computer storage medium having computer readable program code embodied therein performing a method for sharing secure sockets layer (SSL) sessions across multiple processes, the method comprising:
  receiving, by an SSL wrapper process, a request far an SSL session from an application process;
  determining, by the SSL wrapper process, whether the request is for a shared SSL session or an unshared SSL session;
  passing, by the SSL wrapper process, the request to an SSL daemon process, when the request is for the shared SSL session;
  receiving, by the SSL wrapper process, a return code from the SSL daemon process, when the request is for the shared SSL session;
  calling, by the SSL wrapper process, an SSL session, when the request is for the unshared SSL session; and
  receiving, by the SSL wrapper process, a return code from the SSL session, when the request is for the unshared SSL session;
  wherein one of the SSL wrapper process, application process, SSL daemon process communicates with an other of the SSL wrapper process application process, SSL daemon process using application programming interface (API) calls.

9. The article of manufacture of claim 8, wherein the request includes a first input parameter indicating whether the request is for the shared SSL session or the unshared SSL session.

10. The article of manufacture of claim 9, wherein the request includes a second input parameter, the second input parameter being the data thee application process requests to be secured by an SSL session.

11. The article of manufacture of claim 8, wherein the SSL wrapper process communicates with the application process using SSL application programming interface (API) calls.

12. The article of manufacture of claim 8, wherein the SSL wrapper process communicates with the SSL daemon process using SSL application programming interface (API) call.

13. The article of manufacture of claim 8, wherein the SSL daemon process communicates with SSL sessions using SSL application programming interface (API) calls.

* * * * *